US00RE34262E

United States Patent [19]

Benn et al.

[11] E Patent Number: Re. 34,262

[45] Reissued Date of Patent: May 25, 1993

[54] HIGH MODULUS AL ALLOYS

[75] Inventors: Raymond C. Benn, Madison, Conn.; Prakash K. Mirchandani, Troy, Mich.; Walter E. Mattson, Huntington, W. Va.

[73] Assignee: Inco Alloys International, Inc., Huntington, W. Va.

[21] Appl. No.: 705,969

[22] Filed: May 28, 1991

Related U.S. Patent Documents

Reissue of:

[64] Patent No.: 4,834,810
Issued: May 30, 1989
Appl. No.: 190,713
Filed: May 6, 1988

[51] Int. Cl.[5] ..... C22C 21/00

[52] U.S. Cl. ..... 148/437; 148/438

[58] Field of Search ..... 148/437, 438; 420/529, 420/537, 538, 548, 551, 552

[56] References Cited

U.S. PATENT DOCUMENTS

| | | | |
|---|---|---|---|
| 2,966,735 | 1/1961 | Towner et al. | 29/182 |
| 2,973,570 | 3/1961 | Nachtman | 29/182.5 |
| 3,740,210 | 6/1973 | Bomford et al. | 75/0.5 AC |
| 4,557,893 | 12/1985 | Jatkur et al. | 419/12 |
| 4,600,556 | 7/1986 | Donachie et al. | 420/542 |
| 4,624,705 | 11/1986 | Jatkur et al. | 75/239 |
| 4,627,959 | 12/1986 | Gilman et al. | 419/61 |
| 4,643,780 | 2/1987 | Gilman et al. | 148/12.7 A |
| 4,668,282 | 5/1987 | Gilman et al. | 75/0.5 R |
| 4,668,470 | 5/1987 | Gilman et al. | 419/32 |

FOREIGN PATENT DOCUMENTS

| | | |
|---|---|---|
| 0147769 | 7/1985 | European Pat. Off. . |
| 0206727 | 12/1986 | European Pat. Off. . |

OTHER PUBLICATIONS

"Dev. of a Mech. Alloyed Aluminum Alloy for 450°-650° F. Service" Air Force WAL Tech. Report AFML TR79-4210.

"Herstellung and Eigenschafter etc." Aluminum (Duesseldorf) 1975, V51, No. 10, 641-5, Langg et al.

Dispersion Hardening of Aluminum with $Al_4C_3$ Jangg et al., Powder Met. Int., vol. 9, No. 1, 1977.

"New Tech. Developments in the Dispersion Hardening of Al & Cu" Korb et al., Wire, vol. 28, 1979, No. 6, pp. 258-262.

"Coarsening of Rapidly Solidified Al-Ti Alloys" Frazier et al., High Strength Powder Metallurgy Al Alloys II-Oct. 1985.

"Mechanical and Thermal Stability etc.", Frazier et al., Scripta Metallurgica, vol. 21, pp. 129-134, 1987.

*Primary Examiner*—R. Dean
*Assistant Examiner*—Robert R. Koehler
*Attorney, Agent, or Firm*—Blake T. Biederman; Edward A. Steen

[57] ABSTRACT

High modulus aluminum-base alloys comprise mechanically alloyed aluminum-base compositions contain 10-25% titanium part of which may be replaced by vanadium or zirconium. Within described limits the alloys can contain elements other than oxygen and carbon ordinarily derived from the process control agent used in mechanical alloying.

9 Claims, No Drawings

HIGH MODULUS AL ALLOYS

Matter enclosed in heavy brackets [ ] appears in the original patent but forms no part of this reissue specification; matter printed in italics indicates the additions made by reissue.

The present invention is concerned with aluminum-base alloys and, more particularly, with aluminum-base alloys having high room and elevated temperature strength, a modulus of elasticity in excess of about 90 GPa and good ductility.

BACKGROUND OF THE INVENTION AND OBJECT

In aircraft and in other structures, there is often a need for a light metal, i.e. one having a density less than about 3 g/cm$^3$, which is both strong (in terms of tensile and yield strength) and stiff. It is known that light metal (aluminum) composites with silicon carbide can have moduli measuring in excess of about 90 GPa and measuring as high as even 140 GPa. While these aluminum-silicon carbide or boron carbide composites are useful, they are not particularly strong at high temperatures and, at the higher moduli, are relatively brittle.

It is the object of the invention to provide aluminum-base alloys having a combination of high moduli of elasticity and strengths and more particularly to provide aluminum-base alloys which have reasonable tensile elongations coupled with high room and elevated temperature strengths and high moduli.

DESCRIPTION OF THE INVENTION

The present invention contemplates a mechanically alloyed aluminum-base alloy containing in percent by weight about 10–20 or 25% titanium, about 1–4% carbon and about 0.2–2% oxygen other than oxygen present in stable oxides deliberately added to the mechanical alloying charge. The mechanically alloyed aluminum-base alloy of the invention has a modulus of elasticity of at least about 90 GPa and can contain small amounts of other elements in total up to about 10% by weight as described hereinafter. More particularly the alloy of the invention can contain transition elements such as vanadium or zirconium in amounts up to about 5% by weight in replacement of titanium on an atom-for-atom basis. Thus, as a practical matter vanadium can replace titanium on an equal weight basis up to 5% by weight and zirconium can replace up to about 2.5% titanium on the basis of two parts by weight of zirconium to one part by weight of titanium. For definition purposes then, the total weight percent of the elements titanium, vanadium and zirconium shall be interrelated such that $$\%Ti + \%V + 2\%\ Zr = \text{the defined range}$$

The "defined range" in its broadest sense is 10–25% preferably 10–20% and, more narrowly 10–16% and still more narrowly 10–14% or any other range applicable to titanium alone or two or more of titanium, vanadium and zirconium as set forth in this description.

As mentioned hereinbefore, other elements, i.e. auxiliary elements, can be present in the mechanically alloyed aluminum-base alloys of the present invention. Lithium can be present in amounts up to about 3% and copper, nickel, cerium and erbium can be present in total amounts up to about 5%. Other elements such as silicon, beryllium, iron, chromium, cobalt, niobium, yttrium, tantalum and tungsten can be present in total amounts up to about 10%. Boron in small amounts up to about 1% can be advantageously present in the alloys of the invention. Those skilled in the art will appreciate that inclusion of elements other than titanium and elements substituted for titanium will generally tend to increase the hardness of the alloy while lowering ductility. Accordingly, it is advantageous to limit incorporation of other elements by reference to the defined range of titanium and elements substituted for titanium such that at the high end of the range, about 15% titanium, say from 15–20% by weight titanium, auxiliary elements in the alloy are minimized, e.g. up to a total of 2% by weight and below 15% by weight of titanium the permissible amount of auxiliary elements, if any, gradually increases to the total maximas set forth hereinbefore. A like situation exists with regard to deliberately added oxidic materials such as alumina, yttria or yttrium-containing oxide such as yttrium-aluminum-garnet and the like and carbon. In total the optional oxidic materials can be present in a total amount up to about 2% with the maximum being present only when titanium contents are low and auxiliary elements are either in low concentration or absent. Similarly except when the defined range is less than about 15%, carbon should be maintained at a maximum of about 2%.

As stated, the alloys of the present invention consisting of aluminum and the aforestated elements and compounds in the aforestated ranges are made by mechanically alloying elemental or intermetallic ingredients (e.g. $Al_3Ti$) as previously described in U.S. Pat. Nos. 3,740,210, 4,600,556, 4,624,705, 4,643,780, 4,668,470, 4,627,959, 4,668,282, 4,668,282, 4,668,470 and 4,557,893. In mechanically alloying ingredients to form the alloys of the present invention a processing aid such as stearic acid or mixtures of stearic acid and graphite is used. The result of milling particulate aluminum and titanium with or without additional elements along with stearic acid is the formation of amounts of oxide and carbide essentially stoichiometrically equivalent to the amount of carbon and oxygen in the process control agent. In the alloys of the invention these oxides and carbides are primarily $Al_2O_3$ and aluminum carbide with or without modification by titanium. Relatively little titanium carbide is present in the alloy.

After mechanical alloying is complete, that is powder ingredients are thoroughly intermingled by repeated fracturing and refracturing of composite particles and have achieved or substantially achieved saturation hardness, the milled particles, sieved to exclude fines, are placed in a container, degassed under reduced pressure, for example, at 500° C. for 2 to 12 hours, compacted in vacuum under applied pressure and are then extruded. As practical ranges the extrusion ratio can be from about 5 to 1 to about 50 to 1 and the extrusion temperature from about 250° C. to about 600° C.

Compositions, in weight percent, of high modulus aluminum-base alloys of the present invention are set forth in Table 1.

TABLE 1

| Alloy No. | Ti | C | O | V | Al |
|---|---|---|---|---|---|
| 1 | 15.0 | 1.8 | 0.90 | — | Balance E |
| 2 | 11.6 | 1.9 | 0.70 | — | Balance E |
| 3 | 12.5 | 1.5 | 0.80 | — | Balance E |
| 4 | 10.0 | 1.6 | 0.75 | — | Balance E |

TABLE 1-continued

| Alloy No. | Ti | C | O | V | Al |
|---|---|---|---|---|---|
| 5 | 9.8 | 1.56 | 0.62 | 2.2 | Balance E |

These exemplified alloys confirm to the range of about 10–16% titanium, about 1.3–2% carbon, about 0.5–1.2% oxygen, up to about 2.5% vanadium, balance essentially aluminum. After preparing the alloys set forth in Table 1 as described hereinbefore, the alloys were examined as to microstructure. Basically the microstructure shows a large volume fraction of $Al_3Ti$ intermetallic phase present as ultra-fine (usually less than 0.2 micrometer in size) grains very uniformly distributed through a fine grain aluminous matrix. Carbon is essentially present as a very finely divided $Al_4C_3$ or a titanium-doped modification thereof and oxygen is present as grain boundary aluminum oxide.

Room and elevated temperature mechanical characteristics of alloys Nos. 2–5 are set forth in Table 2.

TABLE 2

| Alloy No. | Test Temp. (°C.) | 0.2% Y.S. (MPa) | U.T.S. (MPa) | Elong. (%) |
|---|---|---|---|---|
| 2 | 24 | 427.7 | 496.3 | 7.5 |
| | 149 | 353.5 | 374.5 | 3.6 |
| | 315 | 217.0 | 228.2 | 3.6 |
| | 427 | 123.2 | 134.4 | 5.4 |
| 3 | 24 | 371.7 | 228.0 | 10.0 |
| | 149 | N.A. | N.A. | N.A. |
| | 315 | N.A. | N.A. | N.A. |
| | 427 | N.A. | N.A. | N.A. |
| 4 | 24 | 464.8 | 487.2 | 7.1 |
| | 149 | 362.6 | 393.4 | 4.7 |
| | 315 | 203.0 | 207.9 | 4.8 |
| | 315 | 107.8 | 118.3 | 13.1 |
| 5 | 24 | 532.7 | 590.8 | 3.6 |
| | 427 | 123.9 | 132.3 | 9.9 |

N.A. - Not Available

Table 2 shows that the alloys of the present invention are strong at high temperatures compared to the general run of aluminum alloys made by conventional melting and casting technology.

Moduli of elasticity at room temperature, determined by the method of S. Spinner et al, "A Method of Determining Mechanical Resonance Frequencies and for Calculating Elastic Modulus from the Frequencies", ASTM Proc. No. 61, pages 1221–1232, 1961, for alloys of the present invention are set forth in Table 3.

TABLE 3

| Alloy No. | Modulus of Elasticity, GPa |
|---|---|
| 1 | 112.4 |
| 1* | 115.8 |
| 2 | 102.7 |
| 3 | 102.7 |
| 4 | 95.2 |
| 5 | 103.6 |

*Tested after exposure for 60 hours to a temperature of 482° C.

Table 3 shows the high, room temperature moduli of elasticity exhibited by alloys of the present invention and also shows with respect to alloy 1 that the modulus of elasticity is not degraded by exposure to high temperature. An additional test of mechanical characteristics shows for alloy 2 that at 427° C. the 0.2% yield strength is 121 MPa, the ultimate tensile strength is 132 MPa and the elongation is 5.4%. Laboratory work with mechanically alloyed aluminum alloys has recently shown that mechanical characteristics of this nature at temperatures about 427° C. make the alloy amenable to hot working production processes such as rolling and forging thereby significantly increasing the utility of hard, aluminum alloys containing a solid insoluble intermetallic phase.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A mechanically alloyed, high modulus aluminum-base alloy containing at least one element from the group consisting of titanium, vanadium and zirconium, said vanadium, if present, being in an amount up to about 5% by weight, said zirconium, if present, being in an amount up to about 5% by weight, the percents by weight of titanium, vanadium and zirconium conforming to the relation $$\%Ti+\%V+2\%\ Zr=10\text{–}25\%$$

about 0.1–2% oxygen, about 1–4% carbon with the balance principally being aluminum.

2. A high modulus aluminum-base alloy as in claim 1 wherein the element from said group is titanium and said alloy contains a dispersion of titanium aluminide.

3. A high modulus aluminum-base alloy as in claim 1 which contains as auxiliary elements up to about 3% lithium, up to about 5% total of copper, nickel, cerium and erbium, up to about 1% boron, up to about 10% total of silicon, beryllium, iron, chromium, cobalt, niobium, yttrium, tantalum and tungsten with the proviso that the total of all auxiliary elements does not exceed 10%.

4. A high modulus aluminum-base alloy as in claim 3 wherein said auxiliary elements are present in an amount up to about 2% total and carbon is less than 2% when the $\%Ti+\%V+2\%\ Zr>15\%$ and said auxiliary elements are present in a gradually increasing total amount when the $\%Ti+\%V+2\%Zr>15\%$ and approaches 10%.

5. A high modulus aluminum-base alloy as in claim 1 which contains up to 2% oxidic material in excess of that oxide indicated by the oxygen content specified in claim 1.

6. A high modulus aluminum-base alloy as in claim 5 wherein said oxidic material is selected from the group of alumina and yttrium-containing oxide.

7. A high modulus aluminum-base alloy as in claim 2 which contains about 10% to 16% titanium, about 1.3 to 2% carbon, about 0.5 to 1.2% oxygen, up to about 2.5% vanadium, balance essentially aluminum.

*8. A mechanically alloyed, high modulus aluminum-base alloy containing, in weight percent, 10 to 25% of at least one transition element selected from the group consisting of titanium, vanadium, zirconium, niobium, tantalum, yttrium, tungsten, cerium, erbium, chromium, iron, cobalt, nickel and copper, said vanadium, zirconium, nickel, copper, cerium and erbium each being present in an amount less than about 5%, said niobium, tantalum, yttrium, tungsten, chromium, iron and cobalt each being present in an amount less than 10%, said transition elements being limited to atom-for-atom substitution of 10 to 25% tita-*

*nium, said alloy further containing up to 1% boron, up to 3% lithium, up to 10% silicon and beryllium, about 0.1 to 2% oxygen, about 1–4% carbon, total of said boron, lithium, silicon and beryllium, being less than 2% and said carbon being less than 2% when titanium and transition elements substituted for titanium on an atom-for-atom basis are greater than 15% and total boron, lithium, copper, nickel, cerium, erbium, silicon, beryllium, iron, chromium, cobalt, niobium, yttrium, tantalum, tungsten, vanadium and zirconium being limited to about 10% and the balance being principally aluminum.*

*9. The alloy of claim 8 wherein said transition element is selected from the group consisting of titanium, vanadium, zirconium and niobium.*

* * * * *